(12) United States Patent
Wu et al.

(10) Patent No.: US 7,755,236 B2
(45) Date of Patent: Jul. 13, 2010

(54) CEILING FAN MOTOR

(75) Inventors: Huaxin Wu, Zhongshan (CN); Wenwei Huang, Zhongshan (CN)

(73) Assignee: Zhongshan Broad-Ocean Motor Co., Ltd., Zhongshan (CN)

(*) Notice: Subject to any disclaimer, the term of this patent is extended or adjusted under 35 U.S.C. 154(b) by 484 days.

(21) Appl. No.: 11/744,984

(22) Filed: May 7, 2007

(65) Prior Publication Data
US 2008/0012439 A1   Jan. 17, 2008

(30) Foreign Application Priority Data
Jul. 11, 2006   (CN)   ............... 2006 2 0061702 U

(51) Int. Cl.
*H02K 5/04* (2006.01)
(52) U.S. Cl. ....................... 310/89; 310/67 R
(58) Field of Classification Search ............... 318/268; 310/67 R, 89, 156.01, 12, 13, 18
See application file for complete search history.

(56) References Cited
U.S. PATENT DOCUMENTS 4,073,598 A * 2/1978 Mizutani et al. ............... 416/5
4,687,977 A * 8/1987 Brahmavar et al. ........... 318/492
6,095,767 A * 8/2000 Caughey ....................... 417/411
6,798,098 B1 * 9/2004 Tai .............................. 310/67 R
7,157,872 B1 * 1/2007 Tang ........................ 318/400.41

* cited by examiner

*Primary Examiner*—Quyen Leung
*Assistant Examiner*—Naishadh N Desai
(74) *Attorney, Agent, or Firm*—Matthias Scholl P.C.; Matthias Scholl

(57) ABSTRACT

The invention teaches a ceiling fan motor, and specifically, a brushless DC external rotor motor, comprising an electrical control member and a motor structural member, wherein the motor structural member comprises a shaft 1, a stator 2, and a rotator 3, the stator is fit over the shaft 1, the rotator is fit over the stator 2, and the stator 3 is engaged with the shaft 1 via a pair of bearings 4. The rotator 3 comprises a top end cover 5, a bottom end cover 6, an outer shell cover ring 7, and a plurality of magnets 8, wherein the magnets 8 are positioned along the circumferential direction of the inner wall of the outer shell cover ring 7. The top end cover 5 and the bottom end cover 6 are installed on the top and bottom of the cover ring 7, respectively, and are connected to each other by means of a plurality of bolts and nuts. The ceiling fan motor of the invention provides the advantages of efficient energy consumption, low noise, and high operational stability at low speeds.

8 Claims, 3 Drawing Sheets

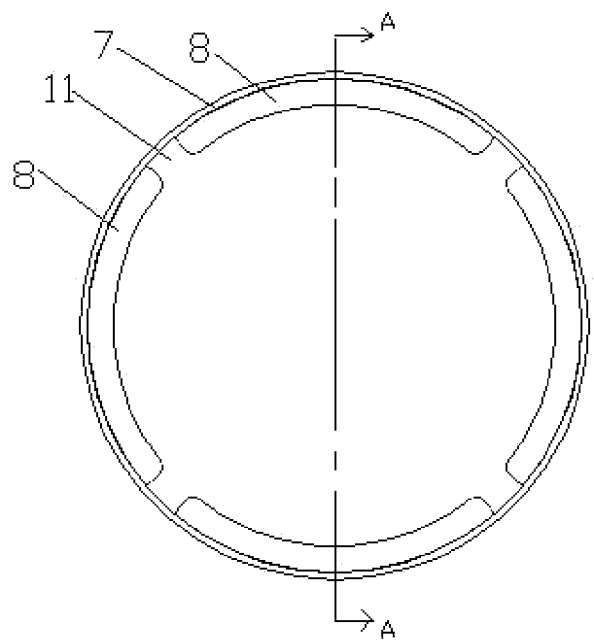
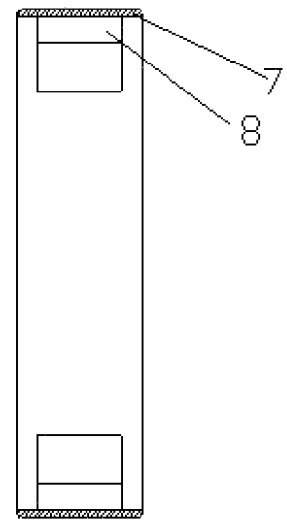
Fig. 3          Fig. 4
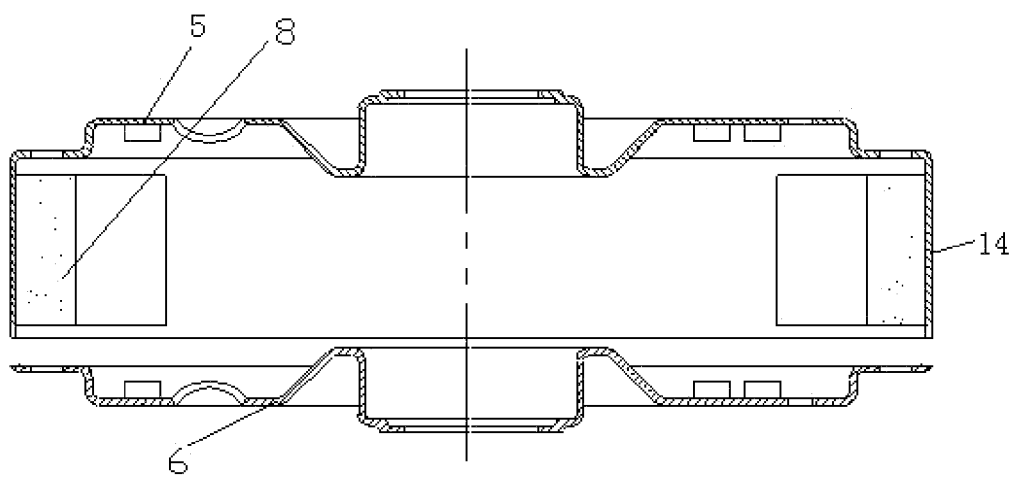
Fig. 5

CEILING FAN MOTOR

CROSS-REFERENCE TO RELATED APPLICATIONS

Pursuant to 35 U.S.C. §119 and the Paris Convention Treaty, this application claims the benefit of Chinese Patent Application No. 200620061702.1 filed Jul. 11, 2006, the contents of which are incorporated herein by reference.

BACKGROUND OF THE INVENTION

1. Field of the Invention

The invention relates to electric motors, and more particularly to ceiling fan motors.

2. Description of the Related Art

Conventional ceiling fans employ single-phase AC induction motors characterized by high energy consumption, low efficiency, booming noise, and unstable operation at low speeds. In addition, the configuration of the rotator in single-phase AC induction motors is complicated, the assembly difficult, and the cost high.

SUMMARY OF THE INVENTION

Therefore, it is one objective of the invention to provide a ceiling fan motor having low energy consumption, low noise, high stability of operation at low speeds, simple structure, and easy assembly.

To achieve the above objective, provided a brushless DC external rotor motor, comprising an electrical control member and a motor structural member. The motor structural member comprises a shaft, a stator, and a rotator. The stator is fit over the shaft, while the rotator is fit over the stator. The rotator is engaged with the shaft via a pair of bearings.

In certain embodiments of the invention, the rotator comprises a top end cover, a bottom end cover, an outer shell cover ring, and a plurality of magnets, wherein the magnets are positioned along the circumferential direction of the inner wall of the outer shell cover ring, the top end cover and the bottom end cover are positioned on the top and bottom of the outer shell race, respectively, and are connected to each other.

In certain embodiments of the invention, the rotator comprises a top end cover, a bottom end cover, and a plurality of magnets, wherein the peripheral edge of the top end cover is projected with a cover ring, a plurality of magnets is positioned along the circumferential direction of the inner wall of the race, the bottom end cover is positioned on the bottom of the cover ring. The top end cover and the bottom end cover are connected to each other.

In certain embodiments of the invention, the top end cover is connected with the bottom end cover via a plurality of bolts and nuts.

In certain embodiments of the invention, a gap is disposed between the two adjacent magnets on the inner wall of the cover ring for the passage of a bolt.

In certain embodiments of the invention, the stator comprises an iron core and a plurality of coil windings coiled thereon.

In certain embodiments of the invention, a circular box is located on top of the rotator for housing the electrical control member of the brushless DC motor.

In certain embodiments of the invention, the shaft has a middle hollow slot through which wires pass through to electrically connect with the coil windings.

As a result, the ceiling fan motor of the invention provides the following advantages: 1) Since the motor adopts brushless DC external rotor motor, it is energy efficient, produces low noise, and can operate stably at low speeds; and 2) The rotator has a simple structure, is easy to assemble, and has a low cost.

BRIEF DESCRIPTION OF THE DRAWINGS

The objects and advantages of the invention will become more readily apparent after reading the ensuing descriptions of the non-limiting illustrative embodiment and viewing the accompanying drawings, in which

FIG. 3 is a partial view of a rotator of a ceiling fan motor in accordance with the invention;

FIG. 4 is a cross-sectional view along the A-A line in FIG. 3;

FIG. 5 is a different structural view of a rotator in accordance with one embodiment of the invention.

DETAILED DESCRIPTION OF THE EMBODIMENTS

Figure 1:
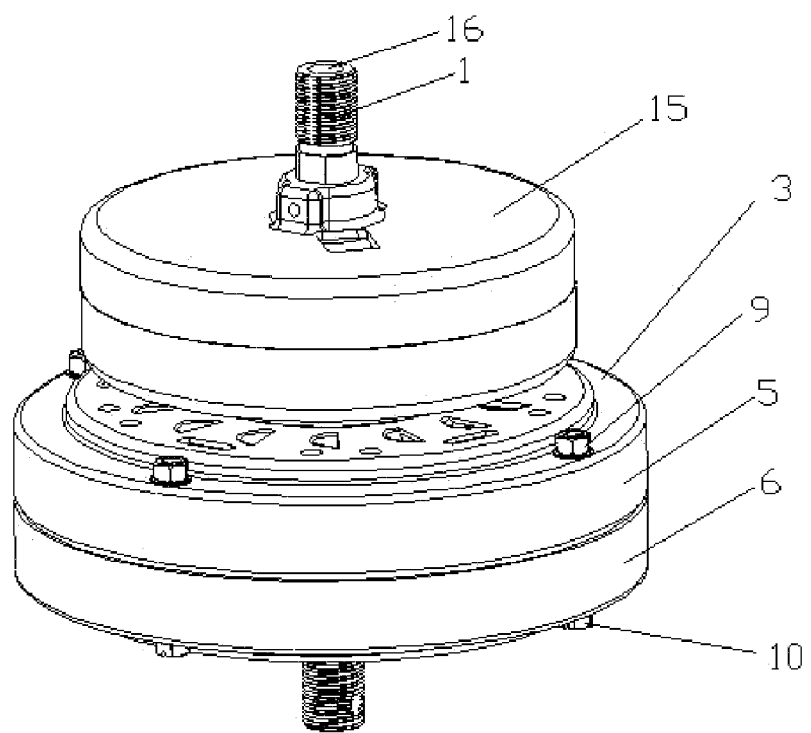
FIG. 1 is a perspective view of a ceiling fan motor in accordance with one embodiment of the invention.
Figure 2:
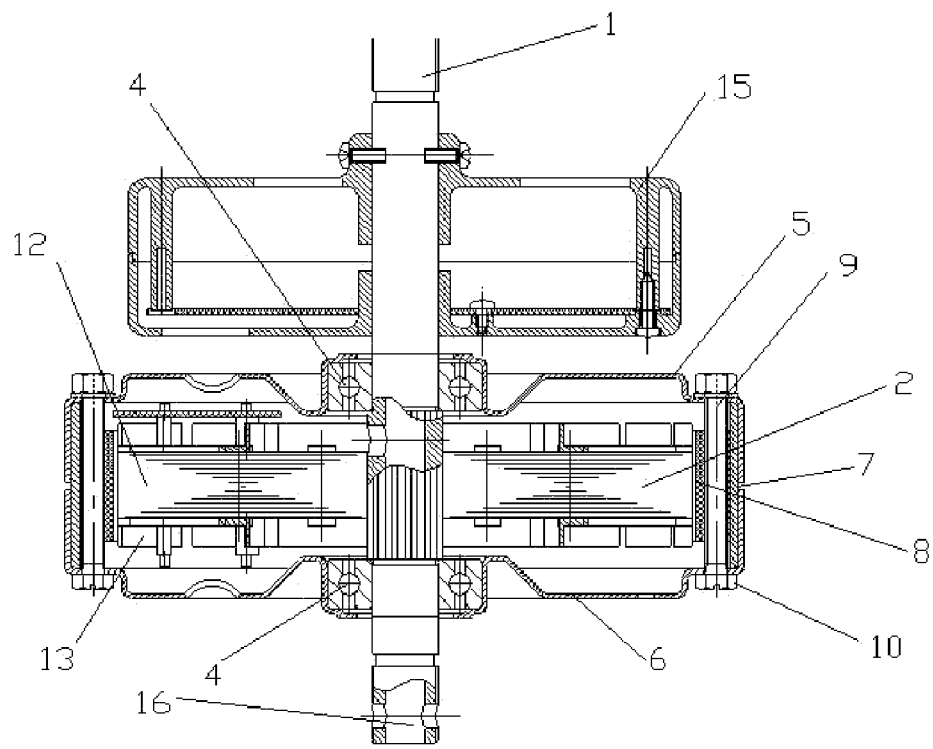
FIG. 2 is a cross-sectional view of a ceiling fan motor in accordance with one embodiment of the invention.

As shown in FIGS. 1-4, the ceiling fan motor of the invention is a brushless DC external rotor motor. The motor comprises an electrical control member and a motor structural member. The motor structural member comprises a shaft 1, a stator 2, and a rotator 3. The stator is fit over the shaft 1. The rotator 3 is fit over the stator 2. The stator 3 is engaged with the shaft 1 via a pair of bearings 4. The rotator 3 comprises a top end cover 5, a bottom end cover 6, an outer shell cover ring 7, and a plurality of magnets 8. The magnets 8 are positioned along the circumferential direction of the inner wall of the outer shell cover ring 7. The top end cover 5 and the bottom end cover 6 are installed on the top and the bottom of the cover ring 7, respectively, and are connected to each other by means of a plurality of bolts 9 and nuts 10. A gap 11 is disposed between the two adjacent magnets on the inner wall of the outer shell cover ring 7, and serves for the passage of the bolt 9. The stator 2 comprises an iron core and a plurality of coil windings coiled thereon. The shaft 1 has a middle hollow slot for the passage of wires to electrically connect with the coil windings 13. A circular box 15 is located on top of the stator 3 for housing the electrical control member of the motor.

Figure 6:
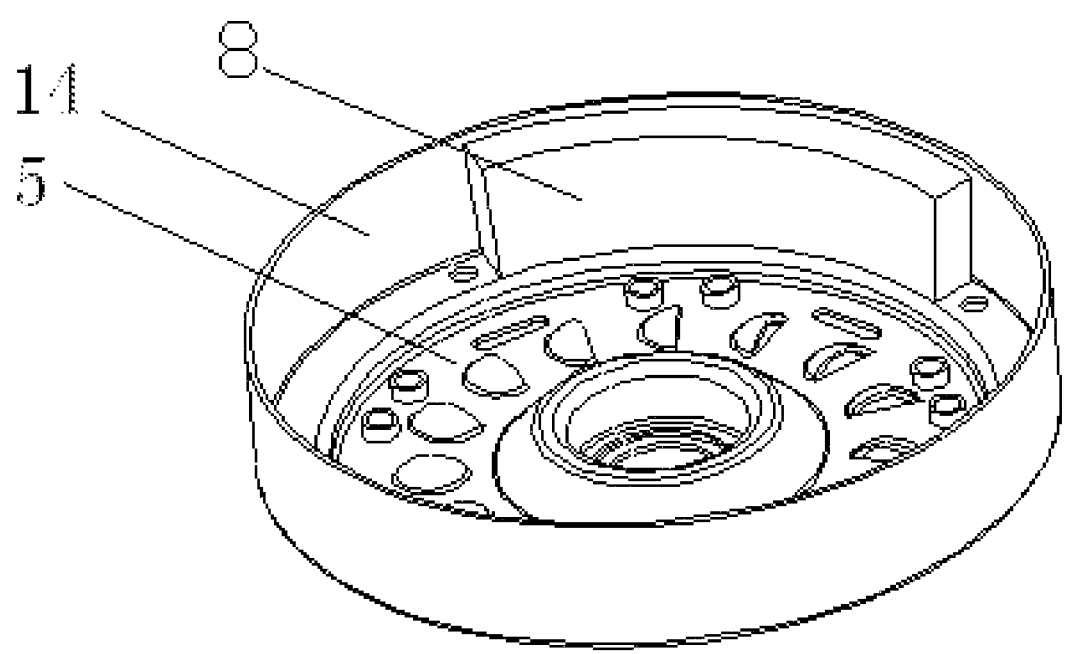
FIG. 6 is a perspective view of the inside portion of the top end cover.

FIGS. 5-6 show the rotator 3. The rotator comprises a top end cover 5, a bottom end cover 6, and a plurality of magnets 8. The peripheral edge of the top end cover 5 is projected with a cover ring 14. The magnets 8 are positioned along the circumferential direction of the inner wall of the ring 14. The bottom end cover 6 is installed on the bottom of the cover ring 14. The top end cover 5 and the bottom end cover 6 are mechanically connected to each other.

A plurality of fan blades is installed on the top end cover 5 or the bottom end cover 6. The stator 2 is fit over the shaft 1. The stator 2 and the shaft 1 are stationary. As the coil windings 13 of the stator 2 are powered on, a rotating magnetic field is induced around the stator 2 driving the magnets 8, the top end cover 5, and the bottom end cover 6 to rotate.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. An electric motor for a ceiling fan comprising
a shaft 1;
a stator 2;
a rotor 3, with a top end cover 5; a bottom end cover 6; an outer shell cover ring 7 having a first end and a second end and having an inner wall; and a plurality of permanent magnets 8; and
at least one bearing 4; wherein
said stator is fit over said shaft 1;
said rotor 3 is fit over said stator 2;
said rotor 3 is engaged with said shaft 1 via at least one said bearing 4;
said magnets 8 are positioned along said inner wall of said outer shell cover ring 7;
said top end cover 5 is disposed at said first end of said cover ring 7;
said bottom end cover 6 is disposed at said second end of said cover ring 7;
said top end cover 5 and bottom end cover 6 are connected to each other via a plurality of bolts 9 and nuts 10, said bolts 9 vertically passing all the way though said top end cover 5 and said bottom end cover 6; and
a plurality of gaps 11 on a radial inner circumference of said top end cover is disposed between two said magnets 8 and serves for the passage of said bolts 9 and said ceiling fan further includes a brushless direct current motor.

2. The motor of claim 1, wherein said stator 2 comprises an iron core 12 and a plurality of coil windings coiled thereon.

3. The motor of claim 2, wherein said shaft 1 comprises a middle hollow slot 16 for the passage of wires to electrically connect with the coil windings 13.

4. The motor of claim 3, wherein a circular box 15 is disposed above said rotor 3 and is mechanically connected to said shaft 1 and said circular box 15 is housing an electrical control member.

5. An electric motor for a ceiling fan comprising
a shaft 1;
a stator 2;
a rotor 3, having a top end cover 5 projected with a cover ring 14 having an inner wall; a bottom end cover 6; and a plurality of permanent magnets 8; and
at least one bearing 4; wherein
said stator is fit over said shaft 1;
said rotor 3 is fit over said stator 2;
said rotor 3 is engaged with said shaft 1 via at least one said bearing 4;
said magnets 8 are positioned along said inner wall of the cover ring 14;
said bottom end cover 6 is disposed at the bottom of said cover ring 14 and is mechanically connected to said cover ring 14;
said top end cover 5 is disposed at the top of said cover ring 14 and is mechanically connected to said cover ring 14;
said top end cover 5 and said bottom end cover 6 are mechanically connected to each other via a plurality of bolts 9 and nuts 10;
a plurality of gaps 11 on a radial inner circumference of said top end cover is disposed between two said magnets 8; and
said bolts 9 pass through said gaps and vertically pass all the way through said top end cover and said bottom end cover and said ceiling fan further includes a brushless direct current motor.

6. The motor of claim 5, wherein said stator 2 comprises an iron core 12 and a plurality of coil windings coiled thereon.

7. The motor of claim 6, wherein said shaft 1 comprises a middle hollow slot 16 for the passage of wires to electrically connect with the coil windings 13.

8. The motor of claim 7, wherein a circular box 15 is disposed above said rotor 3 and is mechanically connected to said shaft 1 and said circular box 15 is housing an electrical control member.

* * * * *